(12) United States Patent
Richards et al.

(10) Patent No.: US 9,607,274 B2
(45) Date of Patent: Mar. 28, 2017

(54) ENTERPRISE VALUE ASSESSMENT TOOL (75) Inventors: Charles E. Richards, Norwich, VT (US); Lisa P. Kable, Norwich, VT (US); Jeffrey W. Doyle, Norwich, VT (US)

(73) Assignee: Chairman's View, Inc., Norwich, VT (US)

( * ) Notice: Subject to any disclaimer, the term of this patent is extended or adjusted under 35 U.S.C. 154(b) by 263 days.

(21) Appl. No.: 13/429,275

(22) Filed: Mar. 23, 2012

(65) Prior Publication Data

US 2013/0253990 A1    Sep. 26, 2013

(51) Int. Cl.
*G06Q 10/06* (2012.01)
*G06Q 10/00* (2012.01)

(52) U.S. Cl.
CPC ....... *G06Q 10/00* (2013.01); *G06Q 10/06393* (2013.01)

(58) Field of Classification Search
CPC ............................................... G06Q 10/06393
See application file for complete search history.

(56) References Cited

U.S. PATENT DOCUMENTS

| | | | |
|---|---|---|---|
| 2004/0039676 A1* | 2/2004 | Trainer | G06Q 40/00 705/36 R |
| 2004/0117234 A1 | 6/2004 | Lindsay-Scott | |
| 2007/0027734 A1* | 2/2007 | Hughes | 705/7 |
| 2007/0136271 A1 | 6/2007 | Masuyama | |
| 2008/0082383 A1* | 4/2008 | Hollas | G06Q 10/0635 705/7.28 |
| 2008/0312990 A1* | 12/2008 | Byrne | G06Q 10/00 705/7.36 |
| 2011/0099503 A1* | 4/2011 | Golani et al. | 715/772 |
| 2011/0161245 A1 | 6/2011 | Hollas | |

OTHER PUBLICATIONS

International Search Report and Written Opinion issued for PCT/US2013/025146, dated Apr. 17, 2013, 10 pages.

* cited by examiner

*Primary Examiner* — Matthew Gart
*Assistant Examiner* — Amanda Gurski
(74) *Attorney, Agent, or Firm* — Norton Rose Fulbright US LLP (57) ABSTRACT

An enterprise value assessment tool includes a feedback engine executed by a computer processor. The feedback engine is implemented as a workbook having a tree structure of weighted nodes configured to generate scores according to user inputs regarding an enterprise respective of market drivers and operational drivers. A threshold engine executed by the computer processor uses the scores to calculate an asset rating and an enterprise value. An output engine executed by the computer processor displays contents of the workbook according to user selections, supplies the user inputs to the feedback engine, and generates one or more reports, including an enterprise value report containing the asset rating and the enterprise value.

29 Claims, 11 Drawing Sheets

FIG. 10 alpha CoreValue® toliwaga    Signed in as Jeff Doyle | My Acount | Sign Out

| Table of Contents | Workbook | Tasks | Reports | Vault |

Growth · Market Size · Market Share · Revenue · Barriers · Differentiation · Brand · Margin · Customers
Company · Financial · Marketing · Operations · Satisfaction · Mgmt. · HR · Legal · Innovaton

Next Steps

Your tasks are suggested 'to do's to improve the value of your company. You can sort your task by Driver, Score (lowest scores will appear first), Value Gap (how much potential value you're not capturing today), of 'Bang for your Buck' (the easier tasks that will give you the biggest Value improvement). With each task, you can either revise your score once you have made progress, or 'drill down' and answer a few more questions in the workbook so we can give you a more specific 'to do' list. ⟵ 1100

Business Asset Rating: 39.0          1102          Enterprise Value Gap: $947,000

| Show Completed | Show Next Step | Sort by Driver | Sort by Score | Sort by Gap | Sort by Bang |

Tasks: Next Steps

| Driver | | Score | Value Gap | Bang/$ |
|---|---|---|---|---|
| Large Potential Market | Future Market Growth<br>*Document your market's future*<br>Document where you think the market will be in the next 1, 5, and 10 years. Ideally, you are in a growing market providing substantial opportunity for your company to grow and make tons of money.<br>Revise Status:<br>  I made progress on this task and I want to update the status of this metric.<br>Drill Deeper:<br>  If you return to the workbook and finish drilling deeper into Company Growth, then we'll be able to offer a more specific to do list. | 0.0 | $20,400 | 🖍🖍🖍🖍 |
| Growth | Company Growth<br>*Grow!*<br>Spend some time documenting your company's growth over the past few years. Growing companies, especially those who are growing faster than their competitors, are valuable. | 4.5 | $33,700 | 🖍🖍🖍 |
| | Competitive Monitoring<br>*Document how you monitor competition* | 2.0 | $16,300 | 🖍🖍 |

ENTERPRISE VALUE ASSESSMENT TOOL

TECHNICAL FIELD

This disclosure is generally directed to a system and method for assigning a value to an enterprise. This disclosure is specifically directed to a system and method for assigning a value to an enterprise as an operating asset, providing a present day value of an enterprise, and predicting the future value of an enterprise.

BACKGROUND OF THE INVENTION

Current enterprise value assessments are almost entirely accomplished by conducting financial valuations. For example, in a typical scenario, the profit generated by an enterprise or business may be multiplied by an industry-specific scalar value to provide an indicator of the value of that business. Otherwise, a business may be valued by examining other financial metrics, such as discounted cash flow and the like. However, according to these current practices, assessing the value of a business by examining financial information necessarily assigns value based on past events or performance (i.e., the process necessarily looks backwards in time). Such methodologies are often times not reflective of a business's current value and are not predictive. Further, these methods fail to value the business as an operating asset. Such methods typically generate a single number that is, at best, indicative of past performance, but are not satisfactorily predictive of the business's future value. In other words, the numbers or metrics generated by such financial assessments fail to consider whether the business is a good operating asset, i.e., one that will have the ability to be profitable in the future. Further, there is no currently-offered solution that guides someone through corrective steps to remedy a relatively low valuation.

BRIEF SUMMARY OF THE INVENTION

In some aspects, an enterprise value assessment tool includes a feedback engine executed by a computer processor. The feedback engine is implemented as a workbook having a tree structure of weighted nodes configured to generate scores according to user inputs regarding an enterprise respective of market drivers and operational drivers. A threshold engine executed by the computer processor uses the scores to calculate an asset rating and an enterprise value. An output engine executed by the computer processor displays contents of the workbook according to user selections, supplies the user inputs to the feedback engine, and generates one or more reports, including an enterprise value report containing the asset rating and the enterprise value.

In other aspects, an enterprise value assessment method includes displaying, by a computer processor, contents of a workbook according to user selections. The workbook has a tree structure of weighted nodes configured to generate scores according to user inputs regarding an enterprise respective of market drivers and operational drivers. The scores are used to calculate, by the computer processor, an asset rating, an enterprise value, and a value gap. A confidence estimate regarding the enterprise value is calculated, by the computer processor. One or more reports is generated by the computer processor, including an enterprise value report containing the asset rating, the enterprise value, the value gap, and the confidence estimate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying figures, in which:

FIG. 11 is a graphical illustration showing display of a prioritized task list in accordance with the present disclosure.

DETAILED DESCRIPTION OF THE INVENTION

Systems and methods for enterprise valuation in accordance with the present disclosure measure value of an enterprise or business as an operating asset, provide a meaningful measurement of present day value of the business, and predict the future value of that business (e.g., how profitable it will likely be in the future). An enterprise value or score may be generated as a present day or predictive number or score based upon market drivers and/or operational drivers. Market drivers relate to factors external to the enterprise that evaluate the market in which the enterprise must function, while operational drivers relate to factors internal to the enterprise that determine the ability of the enterprise to function in that market. These drivers are utilized to meaningfully interpret where the business is positioned within its market space and how it may improve within that space over time. The position may be defined in terms of a comparison between the business and its competitors and/or determined thresholds or benchmarks and the like. The drivers may be customized according to the environment surrounding the business and may be evaluated to estimate qualities of the business that are not otherwise readily apparent. For example, the drivers may be evaluated to examine the internal workings of the business so that internal aspects of the business may be quantitatively measured. By examining the relevant market and internal business operations, an assessment is made of the ability of the business to produce financial results at the present day and its likelihood of doing so in the future.

Figure 1A:
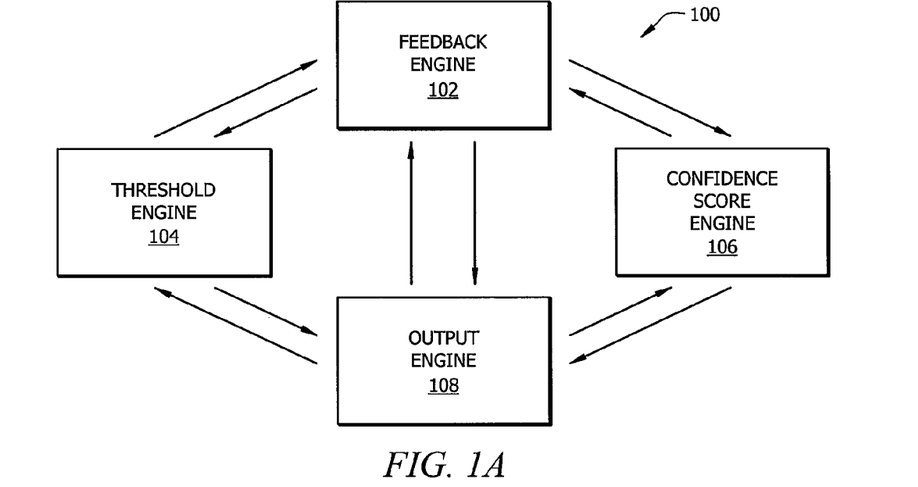
FIG. 1A is a functional block diagram illustrating an enterprise value assessment tool in accordance with the present disclosure.

Referring to FIG. 1A, an enterprise value assessment system 100 in accordance with the present disclosure comprises a feedback engine 102, a threshold engine 104, a confidence score engine 106, and an output engine 108. System 100 is envisioned as being utilized in different contexts and for different purposes. For example, system 100 may be utilized by business owners to gain a more meaningful understanding of the business's value, how that value compares to that of its competitors and/or benchmarks or thresholds, and identify tasks or steps effective to raise that value. Also, prospective purchasers of a business may consider their understanding of the business's value (again, e.g., in terms of current and future profitability) in negotiating the purchase of that business, accounting firms may use the system 100 as part of their annual reporting process, and lenders may use system 100 to make lending decisions. Further, components of system 100 (e.g., engines 102-108) may be implemented at a central facility to aggregate market data and offer services to users of system 100, or distributed across one or more networks to, e.g., improve capacity and data load balancing across system 100 and associated networks. These engines may be implemented as machine code instructions recorded on a non-transitory machine readable medium, such as computer memory, and may be executed by a computer processor connected to a user interface, such as a mouse, keyboard, and monitor. Some examples of non-transitory machine readable media include magnetic media (magnetic disks, cards, tapes, and drums, punched cards and paper tapes, optical disks, barcodes, magnetic ink characters, etc.). Additional examples of non-transitory machine readable media include physical storage media using pins and holes (punch cards, paper tape, etc.) and/or grooves (phonograph, gramophone, dictabelt, capacitance electronic disc, etc.). Further examples of non-transitory machine readable media include optical storage (compact disc, blue ray, DVD, etc.). Still further examples of non-transitory machine readable media include chemical storage (photochemical) and electrical storage (semiconductor, floating gate transistor, etc.).

According to an aspect of the present disclosure, a component of feedback engine 102 is preferably implemented as a workbook of tasks that the user may complete by interacting with the workbook through the output engine 108. As will be explored in greater detail below, the workbook component may be associated with a tree structure, where different branches within the structure comprise leaves or nodes. Each of the branches, and nodes on each branch, may be assigned a weighted value. The weighted value may be indicative of priority, importance, and/or influence the node will have in providing feedback via engine 102. That is, the weighted nodes may be considered to generate scores according to user inputs regarding an enterprise respective of market drivers and operational drivers (see FIG. 4). The workbook component may be authored to facilitate multiple choice data collection from an end user and provide a multi-path mechanism for guiding the end user through the valuation process. The workbook component may prompt an end user response by providing questions or statements to an end user. Doing so may be accomplished on a tiered or step-wise basis, such that a user may complete a certain percent of the workbook. This process is beneficial because it avoids overwhelming the end user and provides a means by which an end user can gather an estimate of the business value (and a confidence score indicative of the degree of accuracy of that score). That is, as the user provides more information or works through additional tiers or steps within the workbook, the degree of certainty provided by feedback engine 102 increases (likewise, the confidence score increases). According to one aspect, the end user is made aware of this degree of certainty and its change as the user provides further information. The workbook component may start at a high conceptual level that provides conceptual feedback and establishes the types of relevant business or enterprise. Determining the relevant business may affect what questions are ultimately presented to a user as well as the weights assigned to branches and/or nodes within the tree structure. At a next level, the user may spend more time quantifying data and receiving feedback that helps them define ways to improve. An author of the workbook chooses the questions to ask, assigns scores to the answers to the questions, assigns weights to the different questions, provides tasks to be assigned, and defines thresholds to trigger generation of the tasks. Further, the workbook component is dynamic in the sense that both the path of branches and/or leaves, and the weighted values of those branches and/or leaves, may change based upon the responses provided by the end user at other branches and/or leaves within the tree structure.

The threshold engine 104 compares scores, values, or other data from feedback engine 102 to thresholds to calculate an asset rating (e.g., a value between one and one-hundred), an enterprise value (e.g., dollar value), and/or a value gap (e.g., a value between one and one-hundred). The enterprise value is calculated based on an algorithm that includes industry normalized trading ranges, financial performance, and the asset rating score. In some embodiments, it does not take into account any balance sheet adjustments. As described in greater detail below (see FIG. 1B), the algorithm uses a stepwise process: (1) obtain the relevant financial performance (e.g., Revenue or Earnings Before Interest, Depreciation, and Amortization (EBIDA) based on the chosen industry of the business; (2) based on the chosen industry, bring in the normalized trading range (e.g., manufacturing trades in a range based on Earnings Before Interest, Taxes, Depreciation, and Amortization (EBITDA)); (3) use the asset rating to determine where in the range the business should be placed; and (4) combine the aforementioned elements to calculate enterprise value. In other aspects, the threshold engine 104 also compares certain scores to thresholds in order to generate flags where the scores are beyond or approaching a threshold. According to one aspect the thresholds are also dynamic. For example, each of the absolute value of the thresholds and the relative or weighted value of those thresholds may change in response to information provided by the end user. In this way, a user can readily be instructed with prioritized tasks where, e.g., violation of a prioritized or particularly important threshold should be corrected as an immediate action. The threshold engine 104 additionally generates a prioritized task list containing next steps to improve at least one of the confidence estimate or the value of the enterprise, and the output engine 108 displays the task list to the user (see FIG. 11). The specific tasks in the list may involve providing more information or they may be real world tasks, such as modifying the way the business is operated, managed, or structured in order to bring that business into alignment with best practices or more rational processing.

The confidence score engine 106 calculates a confidence estimate regarding the enterprise value. For example, the confidence score engine may generate the estimate based on factors such as financial performance versus industry norm, the asset rating, presence of flags that affect the ease with which the enterprise may be sold, and/or amount of completion of the workbook. In turn, the output engine 108 displays contents of the workbook according to user selections, supplies the user inputs to the feedback engine 102, and generates a display of one or more reports, including an enterprise value report containing the asset rating, the enterprise value, the value gap, and the confidence estimate (see FIG. 7). In further, alternative aspects, the output engine 108 generates displays of an overview report (see FIG. 8), a value gap analysis report (see FIG. 9), a flags report (see FIG. 10), and a vault containing printable user inputs (see FIG. 12). Details of these reports and other aspects of the enterprise value assessment tool are further explored below with reference to FIGS. 3-12.

Figure 1B:
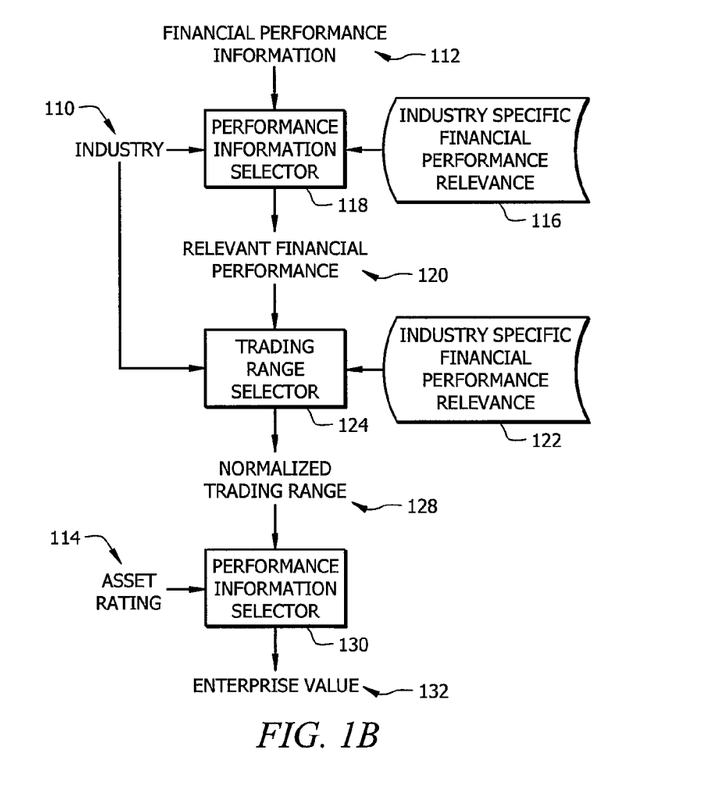
FIG. 1B is a functional block diagram illustrating operational components of a threshold engine in accordance with the present disclosure.

Referring to FIG. 1B, the threshold engine has a number of operational components that receive data gathered during user interaction with the workbook. The data include a user industry selection 110 and financial performance information 112 supplied by the user. The data also include an asset rating 114 generated from user selections by the weighted nodes of the workbook in a manner described in greater detail below (see FIG. 5). The threshold engine has a datastore 116 of information specifying industry specific financial performance relevance. In other words, contents of datastore 116 specify which portions of financial performance information 112 are relevant to assessing the value of an enterprise in each of several industries. A performance information selector 118 receives the industry selection 110 and the financial performance information 112, and accesses datastore 116 to determine which portion of the financial information 112 is relevant based on the industry selection 110. This relevant financial performance 120 is made available to a trading range selector 124 having access to a datastore 122 of industry specific normalized trading ranges. Trading range selector 124 also receives the industry selection 110, and selects a normalized trading range 128 for an enterprise in the industry selection 110 that exhibits the relevant financial performance 120. This normalized trading range 128 is made available to an enterprise value selector 130 that receives the asset rating 114, and uses the asset rating 114 to determine the value of the enterprise value 132 with respect to the normalized trading range 128. For example, for a trading range minimum value ($min), a trading range maximum value ($max), and an asset rating (AR) that is a number between one and one-hundred, the enterprise value (EV) can be determined as:

$$EV=\$min+(AR/100*(\$max-\$min))$$

In some embodiments, a value gap (VG) can further be determined as:

$$VG=\$max-EV$$

Figure 2A:
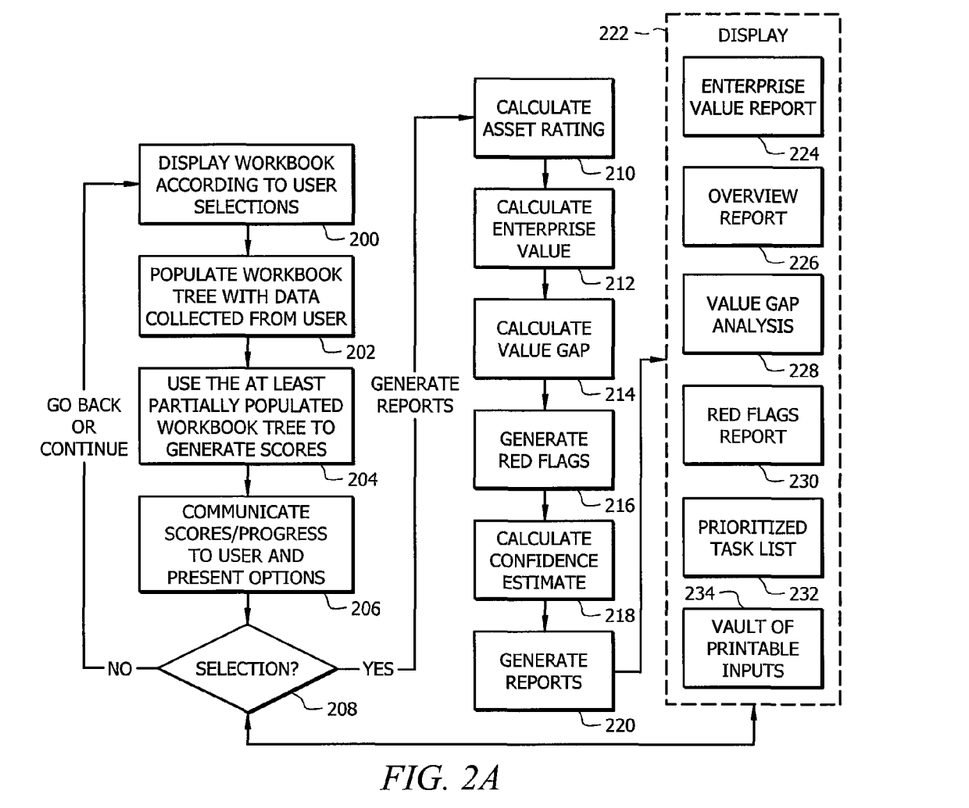
FIG. 2A is flow diagram illustrating an enterprise value assessment method in accordance with the present disclosure.

Turing now to FIG. 2A an enterprise value assessment method in accordance with the present disclosure displays workbook contents to a user (see FIG. 4) at step 200 as, for example, categories of questions (e.g., multiple choice questions and/or opportunities to upload charts or forms; etc.). The workbook tree (see FIG. 3) is populated with data at step 202 based on user responses, and the at least partially populated workbook is used to generate scores (see FIG. 5). The structure of the tree, e.g., the number and arrangement of branches and/or nodes comprising the tree, and the values of the tree, e.g., the relative values, priorities, or rankings of branches and/or nodes within the tree, are populated by a publisher or author of the workbook before the user initiates the process. However, according to some aspects, as data is collected from the user, the tree may be further populated or rearranged according to structure and value in response to information provided by the user. At step 204, nodes of the workbook tree may be populated with a value entered by a user, data contained in a field of one of the reports, or binary values set to indicate whether the user has uploaded a report or chart. The generated scores are communicated to the user together with workbook completion progress and options (see FIG. 6) at step 206. At step 208, these options allow the user to select to go back and refine the scores by completing unfinished sections of the workbook, or to select to continue to additional sections. It is also envisioned that the user may be permitted at step 208 to generate reports, or that reports will be automatically generated after the user has either completed the entire workbook, or selected to skip all of the uncompleted portions of the workbook. During these processes, the scores may be compared to thresholds to generate flags and prioritized task lists as described herein.

Figure 2B:
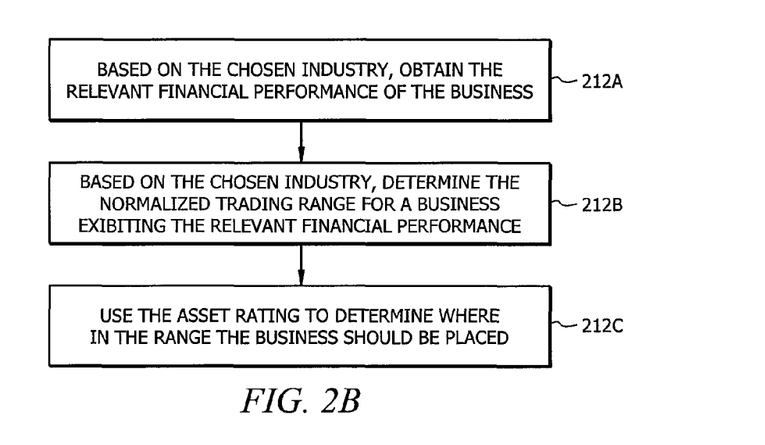
FIG. 2B is a flow diagram illustrating a thresholding method in accordance with the present disclosure.

Generating the reports includes calculating an asset rating at step 210, calculating an enterprise value at step 212, and calculating a value gap at step 214. Referring to FIG. 2B, the method of calculating the enterprise value uses a stepwise process. For example, at step 212A, the process obtains the relevant financial performance (e.g., Revenue or Earnings Before Interest, Depreciation, and Amortization (EBIDA) based on the chosen industry of the business. Also, at step 212B, the process, based on the chosen industry, brings in the normalized trading range (e.g., manufacturing trades in a range based on Earnings Before Interest, Taxes, Depreciation, and Amortization (EBITDA)). Additionally, at step 112C, the process uses the asset rating to determine where in the range the business should be placed. In other words, the three elements (i.e., chosen industry, financial information, and asset rating) are combined to calculate enterprise value as described above with reference to threshold engine 104 (see FIG. 1A and FIG. 1B). In other aspects, the threshold engine 104 also compares certain scores to thresholds in order to generate flags where the scores are beyond or approaching a threshold.

Returning to FIG. 2A, thresholds are applied to the scores to generate flags at step 216. Then, a confidence estimate is calculated at step 218 based on factors such as financial performance versus industry norm, the asset rating, presence of flags that affect the ease with which the enterprise may be sold, and/or amount of completion of the workbook. Then the reports are generated at step 220 and displayed at 222 according to user selections made at step 208. Reports generated at step 220 and displayed at step 222 may include an enterprise value report 224 (see FIG. 7). The enterprise value report 224 contains the asset rating, the enterprise value, the value gap, and the confidence estimate. Other reports that may be generated at step 220 and displayed at step 224 include an overview report 226 (see FIG. 8), a value gap analysis report 228 (see FIG. 9), and a flags report 230 (see FIG. 10). Another report that may be generated at step 220 and displayed at step 222 includes a prioritized task list (see FIG. 11) containing next steps to improve at least one of the confidence estimate or the value of the enterprise. Thresholds may be applied to the scores to select and prioritize these tasks. Also displayed at step 222 may be a vault containing printable user inputs (see FIG. 12). Details of these reports and other aspects of the enterprise value assessment method are further explored below with reference to FIGS. 3-12.

Figure 3:
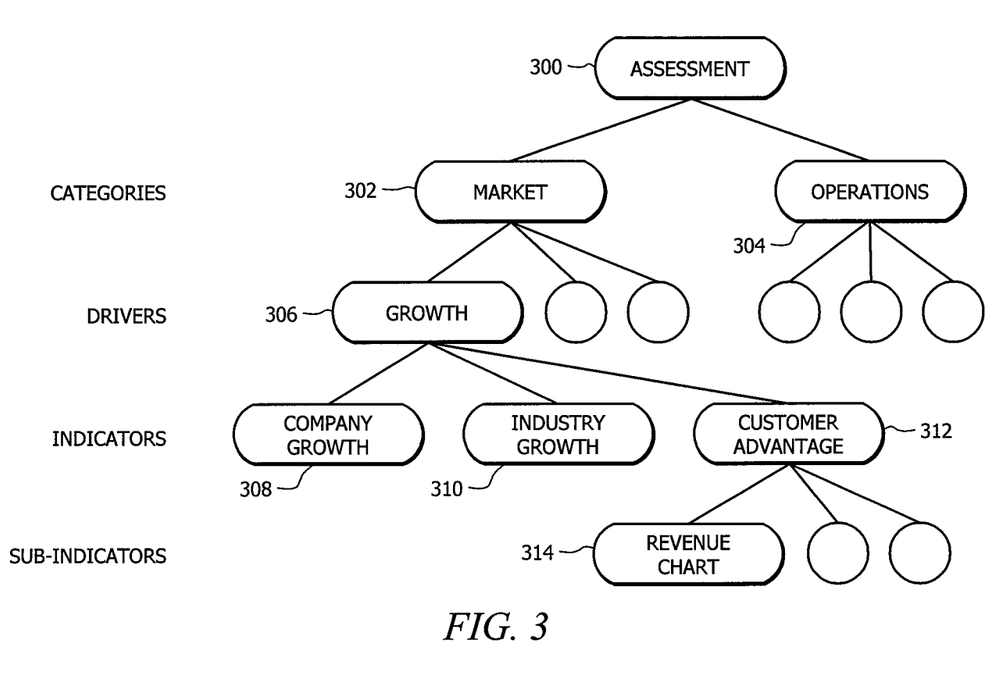
FIG. 3 is a graphical illustration showing a tree structure of a workbook in accordance with the present disclosure.

FIG. 3 shows an exemplary tree structure of a workbook in accordance with the present disclosure. The root node 300 may be an assessment node, and the child nodes of the root node 300 may be two category nodes, including a market node 302 and an operations node 304. Child nodes of the category nodes may be driver nodes, such as a growth node 306. Children of the driver nodes may be indicator nodes. For example, the indicators nodes beneath growth node 306 may be a business growth node 308, an industry growth node 310, and a customer advantage node 312. Children of the indicator nodes may be sub-indicator leaf nodes. For example, the leaf nodes beneath the customer advantage node 312 may include a revenue chart node 314.

An author of the workbook may associate specific tasks with the nodes. For example, a task associated with the revenue chart node 314 may be to upload a revenue chart. Also, a task associated with the business growth node 308 may be to select a value providing an estimate of growth for this driver. Other types of tasks may be assigned to the nodes as will be appropriate for satisfactorily assessing the enterprise with respect to each driver. The nodes may also be weighted by the author. Accordingly, the workbook has a tree structure of weighted nodes configured to generate scores according to user inputs regarding an enterprise respective of market drivers and operational drivers.

Figure 4:
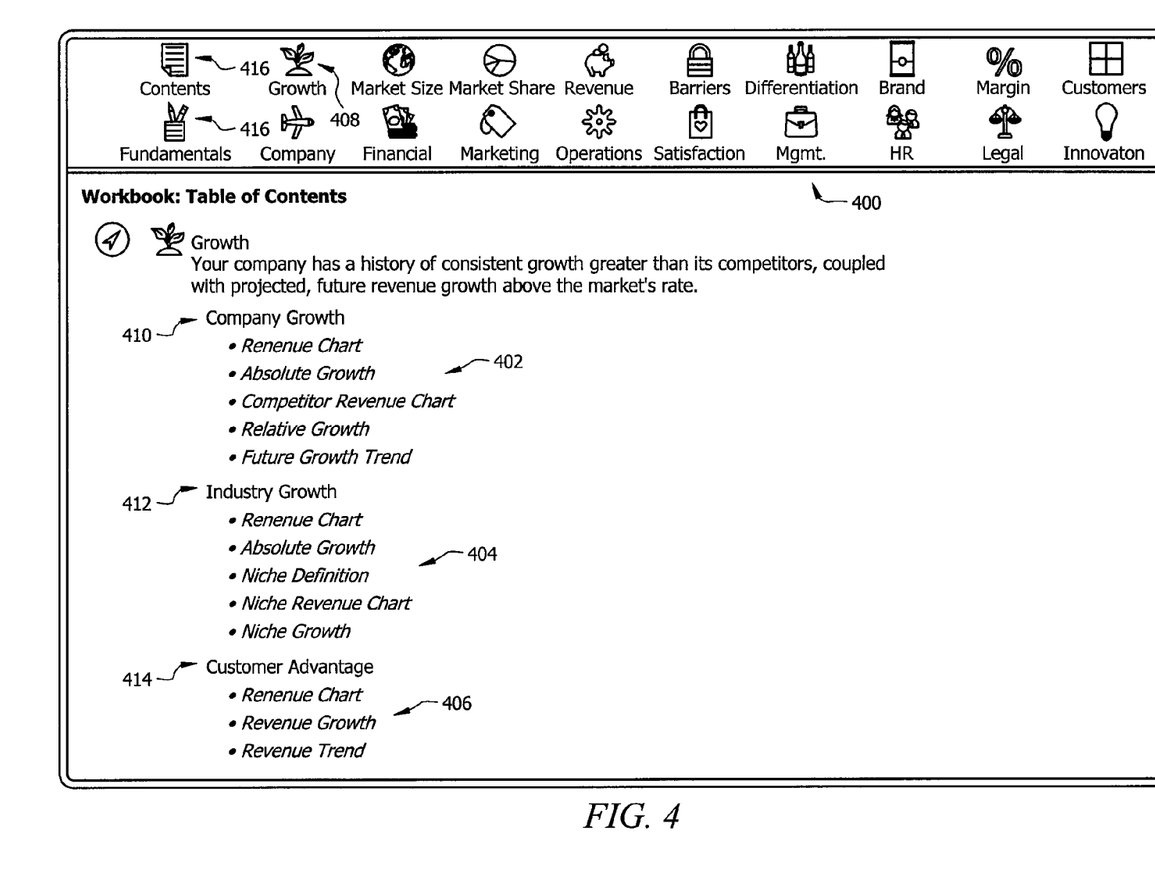
FIG. 4 is a graphical illustration showing a user navigable display of workbook contents in accordance with the present disclosure.

FIG. 4 shows a user navigable display of workbook contents in accordance with the present disclosure. There may be, for example, eighteen drivers, including market drivers (e.g., growth, recurring revenue, brand, large potential market, barriers to entry, margin advantage, dominant market share, production differentiation, and customer diversification) and operational drivers (e.g., business overview, operations, human resources, financial, customer satisfaction, legal, sales and marketing, senior management, and innovation) A table of contents may be displayed for the workbook that corresponds to these drivers, and that provides hyperlinks to the various indicators and/or sub-indicators under each driver. For example, icons 400 corresponding to the drivers may be displayed, and hyperlinks 402, 404, and 406 for indicators and/or sub-indicators of a driver may be displayed upon selection by the user of an icon for the driver in question. In this example, selection of the growth driver icon 408, may trigger display of business growth indicator 410, industry growth indicator 412, and customer advantage indicator 414, with hyperlinks 402, 404, and 406 to workbook tasks associated with their respective sub-indicators displayed to the user. In particular, the business growth indicator 410 may have displayed therewith hyperlinks 402 for sub-indicators including: revenue chart; absolute growth; competitor revenue chart; relative growth; and future growth trend. Similarly, the industry growth indicator 412 may have displayed therewith hyperlinks 404 for sub-indicators including: revenue chart; absolute growth; niche definition; niche revenue chart; and niche growth. Additionally, the customer advantage indicator 414 may have displayed therewith hyperlinks 406 for sub-indicators including: revenue chart; revenue growth, and revenue trend. Accordingly, a user navigable display of workbook contents is provided that allows users to navigate the workbook and select which tasks to complete. Additional icons, including contents icon 416 and fundamentals icon 418, can also be provided. Contents icon 416 can respond to user interaction by providing an index of all drivers, indicators and sub-indicators. Fundamentals icon 418 can respond to user interaction by linking to company information.

Figure 5:
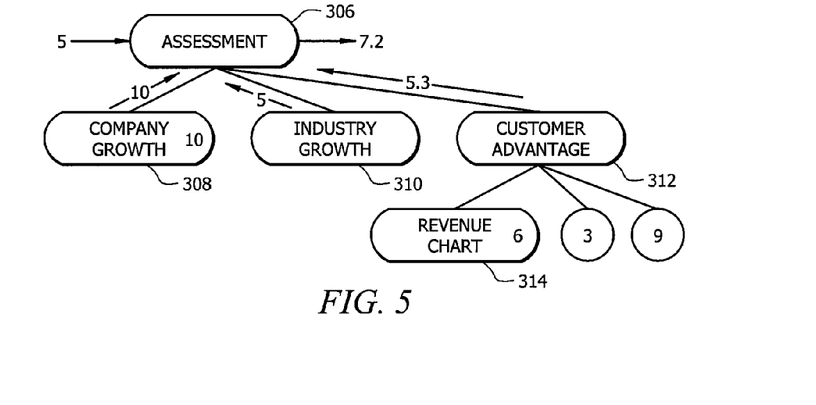
FIG. 5 is a graphical illustration showing iterative score refinement via the workbook in accordance with the present disclosure.

FIG. 5 shows iterative score refinement using the workbook in accordance with the present disclosure. It should be appreciated that nodes may be assigned default scores by users and/or workbook authors. For example, growth node 306 may be assigned a default score equal to five, and this default value may be inherited by child nodes, such as industry growth node 310. Default scores, however, may be replaced by scores specified by users and/or calculated from scores of child nodes. For example, a user may supply a score of ten for business growth node, and a score of six may be supplied to revenue chart node 314 upon upload of a revenue chart. Customer advantage node 312 may be configured to obtain a score as a weighted average of the scores of its child nodes, as may growth node 306. It should be understood that other score calculations processes may be assigned to nodes, such as comparison of scores, addition of scores, or any other equation. It is envisioned that scores of a node may be specified or extracted from designated fields of uploaded documents or completed forms as configured by a workbook author. It is also envisioned that weights may be industry specific. Thus, scores may be iteratively refined using the workbook.

Figure 6:
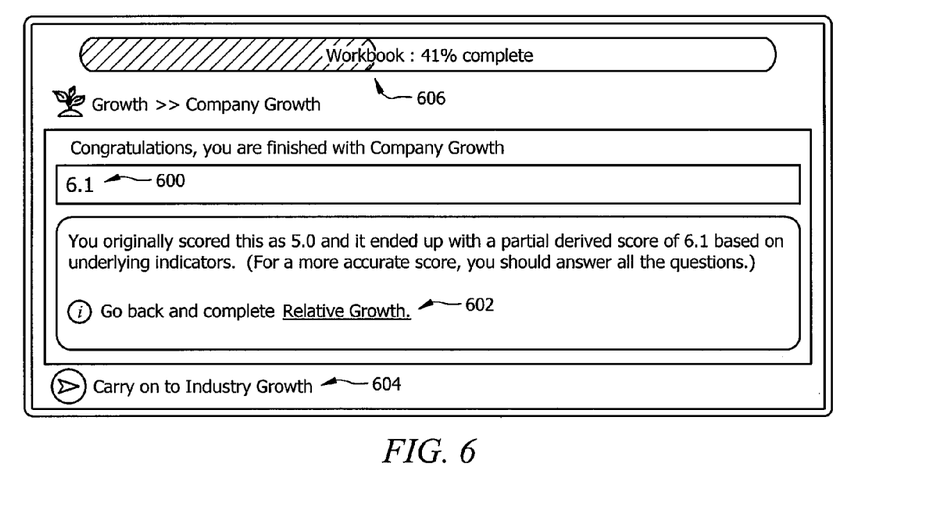
FIG. 6 is a graphical illustration showing a display of feedback to a user in accordance with the present disclosure.

FIG. 6 shows a display of feedback to a user in accordance with the present disclosure. For example, upon completion of a business growth section of the workbook, a message may be displayed to the user that provides the score 600 generated by the partially completed workbook. Information may also be supplied regarding how the score was derived, and any incomplete sub-sections of the workbook for this section. An option 602 may be presented for user selection to trigger return to an incomplete sub-section of the workbook. Another option 604 may be presented for user selection to trigger skipping on to a next section of the workbook. A progress indicator 606 may also be provided to indicate, for example, percentage of workbook completion in the form of a bar graph.

Figure 7:
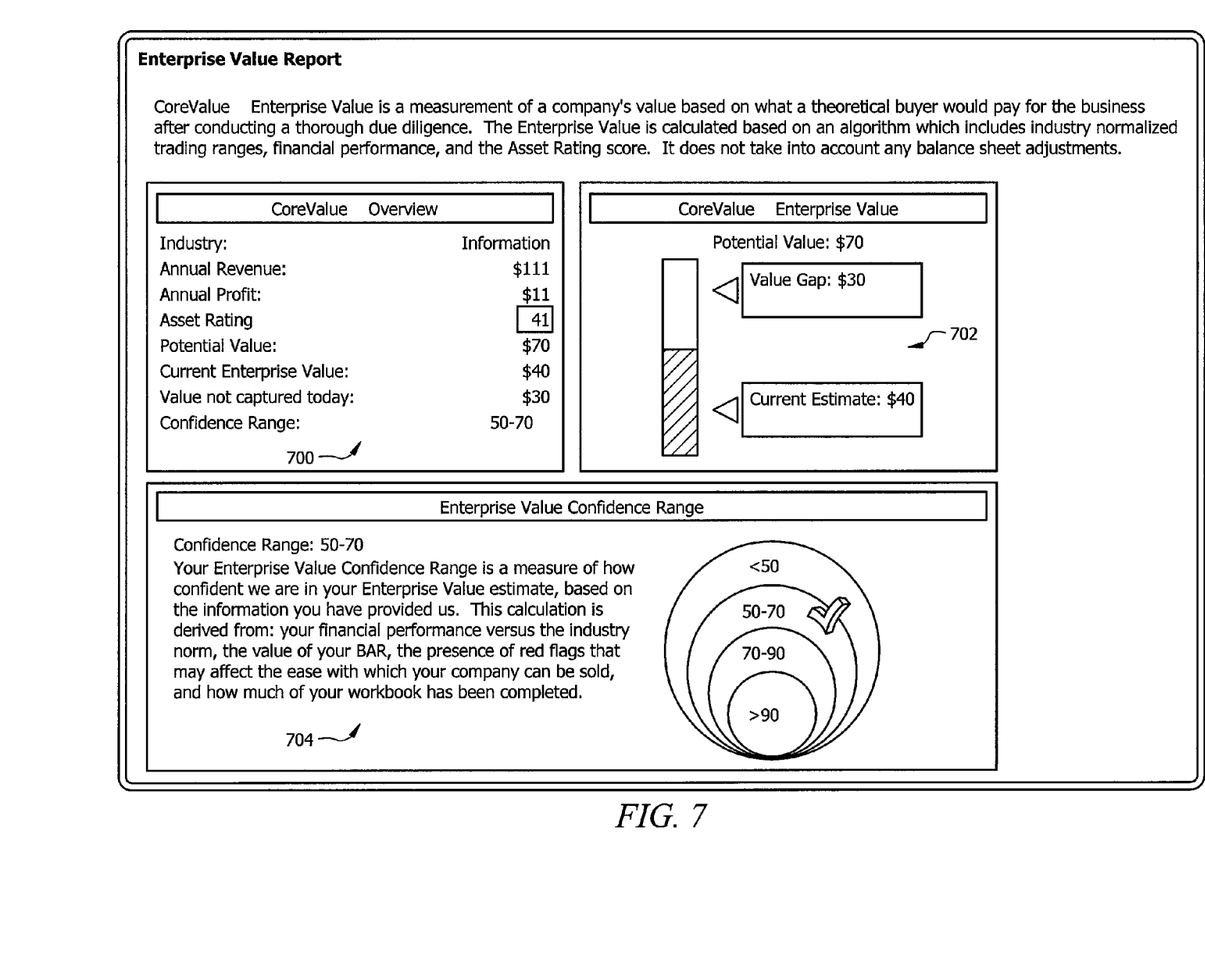
FIG. 7 is a graphical illustration showing display of an enterprise value report in accordance with the present disclosure.

FIG. 7 shows display of an enterprise value report in accordance with the present disclosure. A message may report that the enterprise value is calculated to represent a measurement of the business's value based on what a theoretical buyer would pay for the business after conducting a thorough due diligence. The message may explain that the enterprise value is calculated based on an algorithm that includes industry normalized trading ranges, financial performance, and the asset rating score, and that it does not take into account any balance sheet adjustments. The enterprise value report supplies an enterprise value overview 700 that may include: industry; annual revenue; annual profit; asset rating; potential value (e.g., based on the high end of the normalized trading range); current enterprise value; value not captured today; and a confidence range. A graphical display 702 of the enterprise value may take the form of a bar graph communicating the current enterprise value estimate; the potential value; and a value gap that is the difference of the potential value and the current enterprise value. A message 704 may be included with a graphical representation to explain the confidence range, and how it is derived. In particular, the message may explain that the confidence range is based on factors such as financial performance versus industry norm, the asset rating, presence of flags that affect the ease with which the enterprise may be sold, and/or amount of completion of the workbook.

Figure 8:
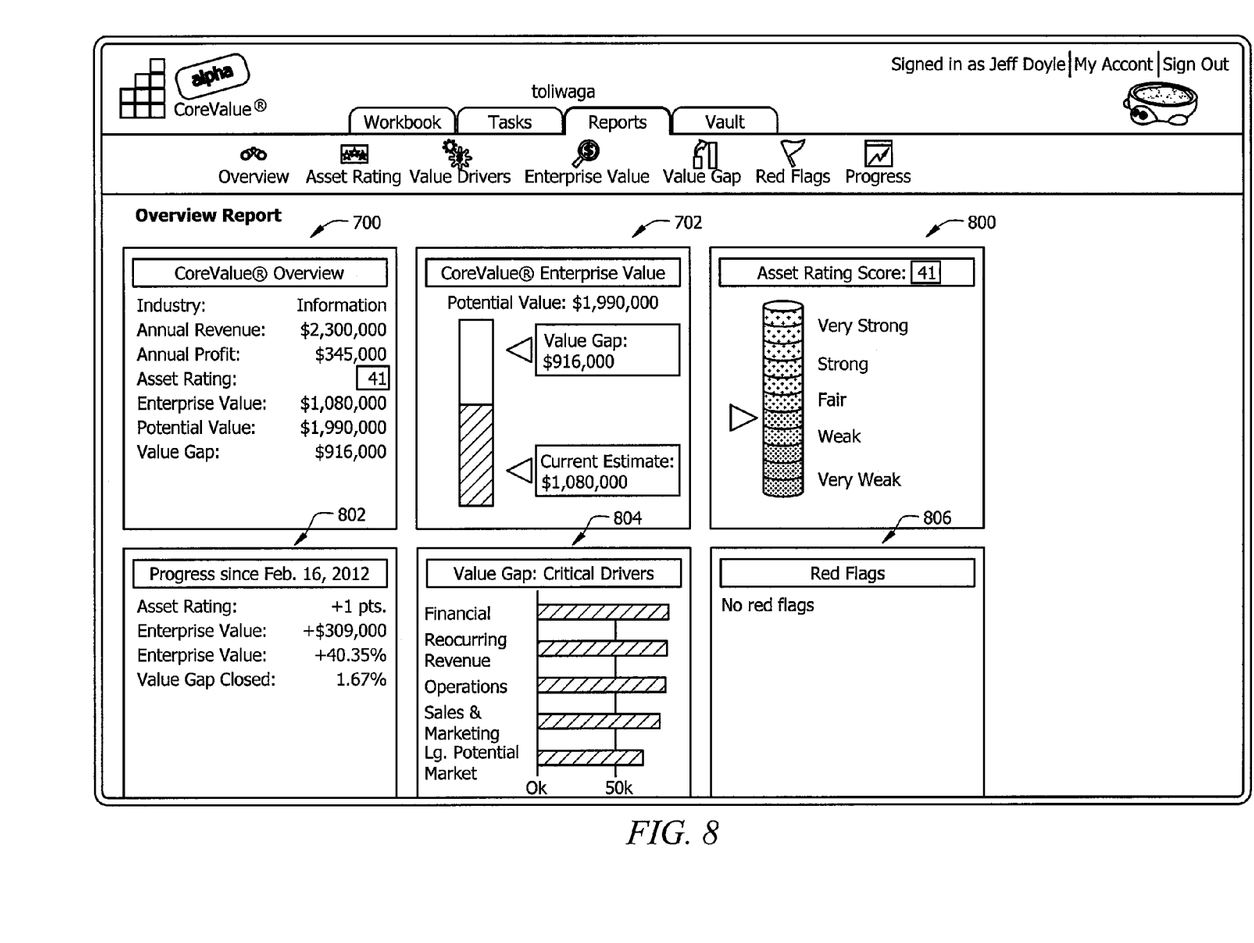
FIG. 8 is a graphical illustration showing display of an overview report in accordance with the present disclosure.

FIG. 8 shows display of an overview report in accordance with the present disclosure. The overview report may contain the enterprise value overview 700 and the graphical display 702 of the enterprise value. It may also contain a graphical representation 800 of the asset rating score showing the relative strength of the score using a bivalent chart and a color spectrum. Additional contents of the overview report may include a progress report 802 showing amounts or percentages of change in asset rating, enterprise value, and value gap. The additional contents may also include an illustration of critical drivers 804 most contributing to the value gap, and a list of flags 806. A set of tabs 808 at the top of the overview report may permit user navigation to return to the workbook or view other reports, such as a task list and a vault as mentioned above and described further below with reference to FIG. 11 and FIG. 12.

Figure 9:
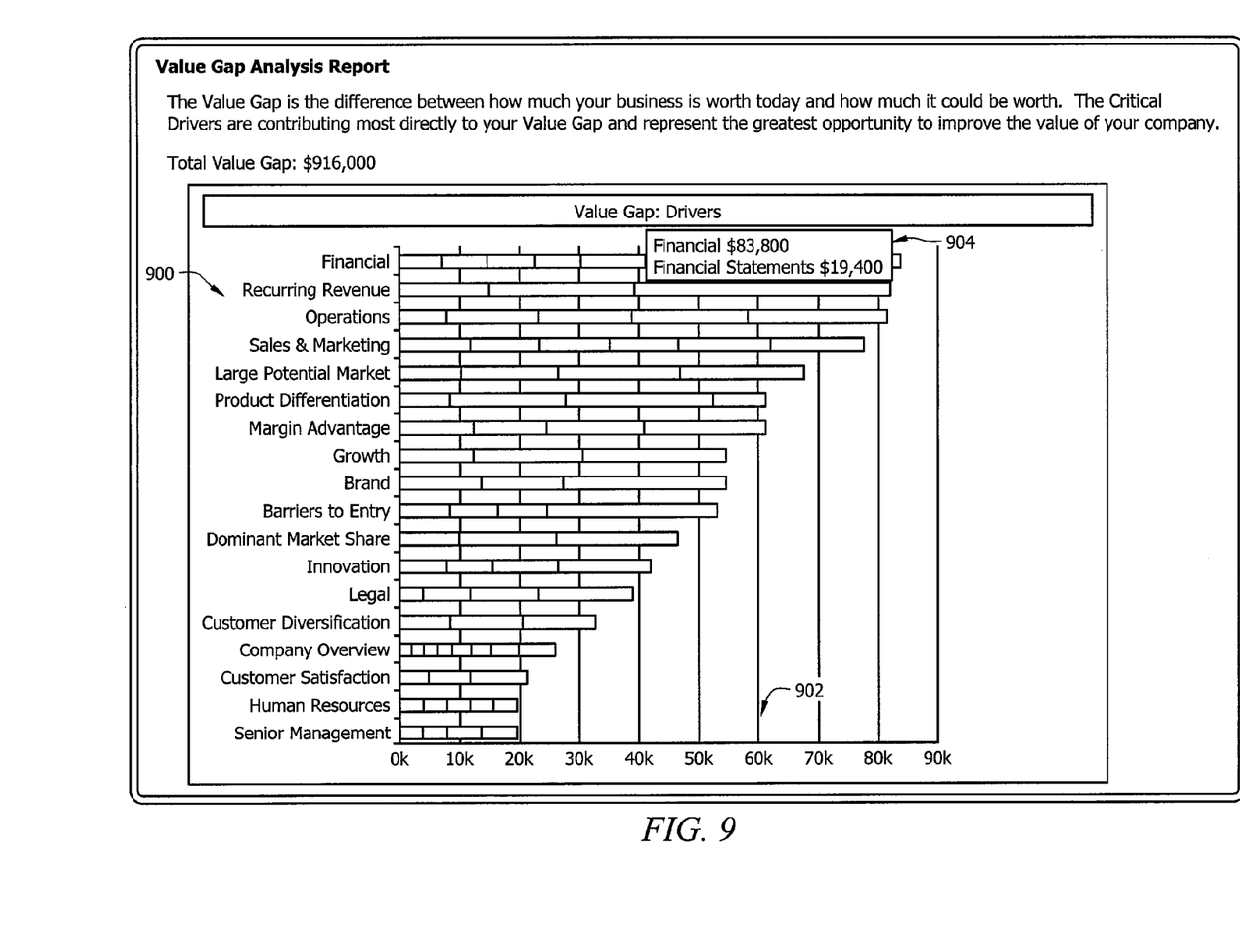
FIG. 9 is a graphical illustration showing display of a value gap analysis report in accordance with the present disclosure.

FIG. 9 shows a display of a value gap analysis report in accordance with the present disclosure. This report shows an analysis of the value gap broken down by driver and indicator in the form of a graph. One axis 900 of the graph may communicate the drivers to the user in order of importance, and another axis 902 of the graph may communicate the dollar amount of contribution of each driver to the value gap, and a message 904 may be displayed that lists dollar values for each indicator associated with a driver. For example, hovering a mouse pointer over a driver may trigger message 904 to appear and provide indicator information.

Figure 10:
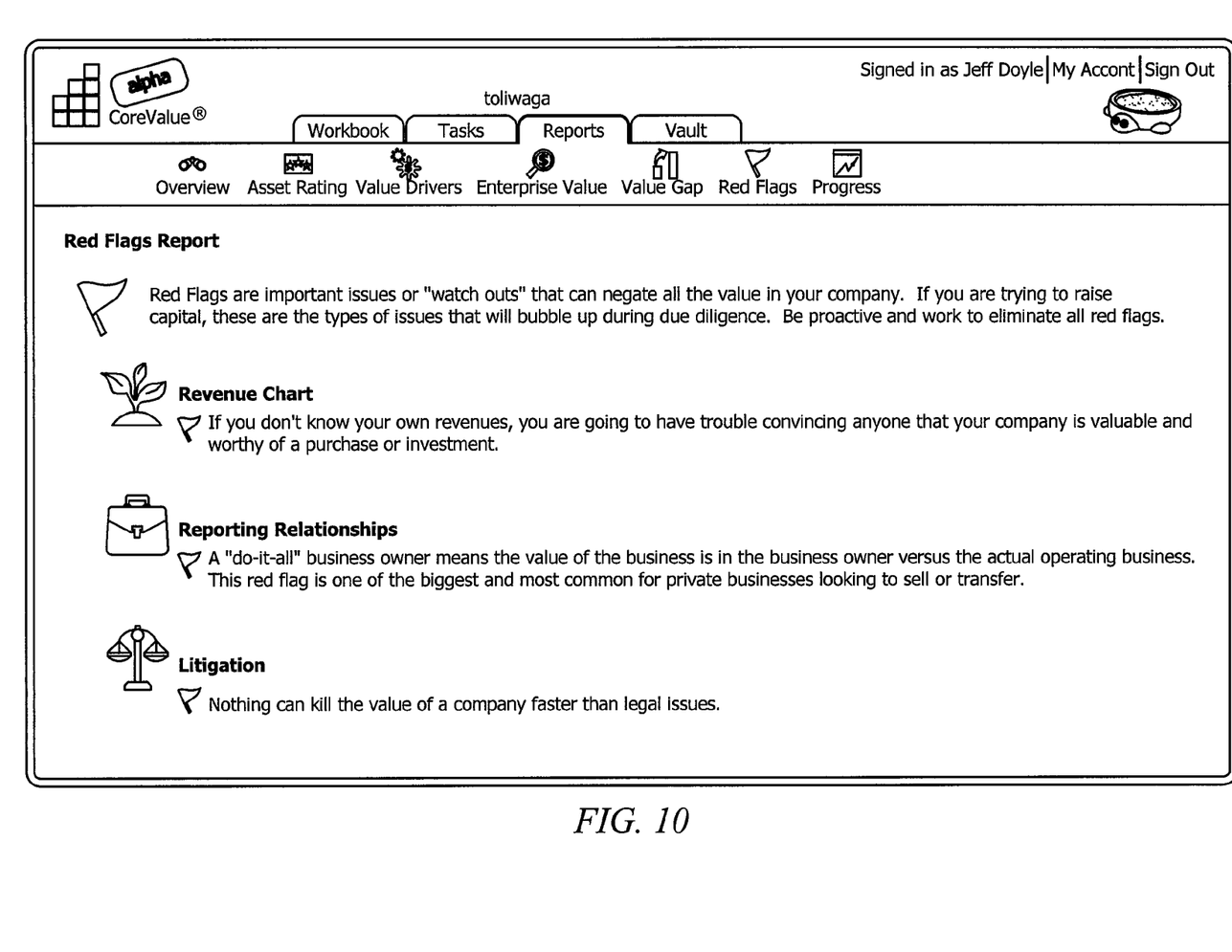
FIG. 10 is a graphical illustration showing display of a flags report in accordance with the present disclosure.

FIG. 10 shows a display of a flags report in accordance with the present disclosure. The flags are triggered by scoring thresholds, and may be triggered by questions without affecting asset rating. The flags may be reported with messages explaining their importance, together with instructions to clear the flags. It is envisioned that options may be supplied to clear flags, such as return to and complete an unfinished portion of the workbook, or purchase services from service providers. Examples of flags include: lack of a revenue chart; a "do it all" business owner; and presence of litigation.

FIG. 11 shows a display of a prioritized task list in accordance with the present disclosure. This task list reports the value gap and asset rating, and provides a list of tasks that need to be completed in order to close the value gap. For example, if a user has been asked to upload a revenue chart but does not do so, then a task may appear on the task list to make a revenue chart. In another example, if a user has been asked how many factors will affect future growth, then the number of factors identified may I trigger different tasks and/or reprioritize the task list. The tasks may involve obtaining data for the industry's of the business's primary products, creating an organizational chart, or any other task that will assist in reducing the value gap. Thresholds applied to select the tasks may be based on score, dollar amount by which the value gap will be closed by completion of the task, and ease of task completion. For example, in a "bang for the buck" prioritization, tasks may be initially sorted by the dollar amount, and then tasks that will be easier to complete may be promoted to the top of the list. A sort control 1100 may be provided that allows the user to sort the tasks by the dollar amount, by the bang for the buck, by score, and by driver. Additional controls 1102 may be provided to switch views between completed tasks and tasks yet to be completed. It is envisioned that the tasks may be tasks form the workbook. It is also envisioned that tasks may be included in the task list that are not included in the workbook, but may be indicated as needed based on results of the workbook completion or partial completion. For example, it is envisioned that advertisements and/or options to procure goods and/or services may be provided that are deemed to needed by the user based on the results of the assessment.

Figure 12:
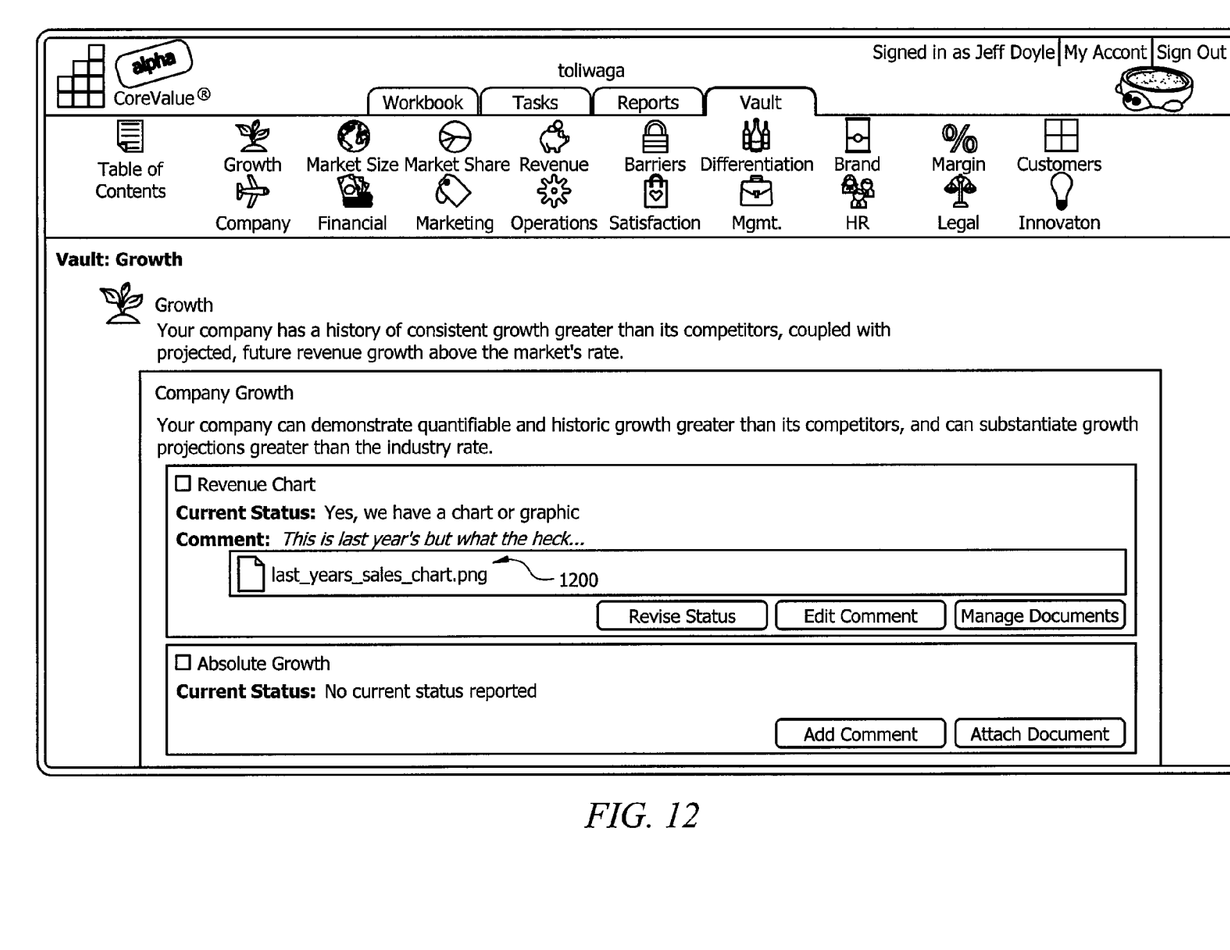
FIG. 12 is a graphical illustration showing display of a vault of printable user inputs in accordance with the present disclosure.

FIG. 12 shows display of a vault of printable user inputs in accordance with the present disclosure. The vault is a repository of inputs that may be formatted and printed. In some aspects, the workbook may be authored to guide the user through the process of putting together a set inputs that may become a book of materials that the user eventually uses to market the transition of the enterprise. For example, a sales chart 1200 and other materials may be accessed from the vault. A navigation interface may follow the workbook structure and provide access to the materials under the appropriate drivers, indicators, and sub-indicators.

Although the present invention and its advantages have been described in detail, it should be understood that various changes, substitutions and alterations may be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An enterprise value assessment system for providing a forward-looking value of an enterprise, the system comprising:
    a feedback engine executed by a computer processor, wherein said feedback engine is implemented as a workbook having a tree structure of nodes configured to generate scores according to user inputs regarding an enterprise respective of market drivers and operational drivers;
    a threshold engine executed by the computer processor to use the scores to calculate an asset rating and the value of the enterprise; and
    an output engine executed by the computer processor to display contents of the workbook according to user selections, supply user inputs to the feedback engine, and generate one or more reports, including an enterprise value report containing the asset rating and the value of the enterprise;
    a confidence score engine executed by the computer processor to calculate a confidence estimate regarding the enterprise value, wherein said output engine is further executed by the computer processor to generate the enterprise value report to contain the confidence estimate;

wherein the computer processor:
- executes said output engine to populate the workbook with collected user data, thereby generating a partially completed workbook;
- executes said feedback engine to use the partially completed workbook to generate the scores;
- executes said output engine to provide feedback to the user by displaying the scores, displaying an indication of workbook completion progress, displaying information regarding how at least one score for a section of the workbook was derived and one or more incomplete sub-sections of the workbook for the section, and displaying two or more options, including a first option selectable by the user to go back and refine the scores by completing at least one unfinished section of the partially completed workbook, and a second option selectable by the user to continue to a next section of the partially completed workbook without first completing the at least one unfinished section of the partially completed workbook;
- executes said confidence score engine to calculate the confidence estimate based on:
  - financial performance versus industry norm:
  - the asset rating;
  - presence of flags that affect the ease with which the enterprise may be sold; and
  - amount of completion of the workbook; and
- executes said output engine to present data representative of the value of the enterprise and an interactive prioritized task list to the user via a user interface, where the interactive prioritized task list is configured to allow the user to take steps to improve the value of the enterprise.

2. The enterprise value assessment system of claim 1, wherein said threshold engine is further executed by the computer processor to use the scores to calculate a value gap, and said output engine is further executed by the computer processor to generate the enterprise value report to contain the value gap.

3. The enterprise value assessment system of claim 2, wherein the computer processor executes said threshold engine and said output engine to compare the scores to predetermined thresholds and generate a prioritized task list containing next steps to improve at least one of the confidence estimate or the value of the enterprise, wherein the computer processor executes said output engine to display the prioritized task list having at least one task that includes the first option selectable by the user to go back and refine the scores by completing the at least one unfinished section of the partially completed workbook.

4. The enterprise value assessment system of claim 2, wherein the computer processor executes said output engine to render the prioritized task list sortable by the following:
- driver;
- score;
- value gap; and
- bang for the buck.

5. The enterprise value assessment system of claim 2, wherein the computer processor executes said output engine to generate an overview report containing the asset rating, the enterprise value, the value gap, progress regarding improvement of the enterprise value, flags, critical drivers responsible for the value gap, and graphical assessments of the enterprise value and asset rating.

6. The enterprise value assessment system of claim 2, wherein the computer processor executes said output engine to generate a value gap analysis providing a graphical assessment of critical drivers responsible for the value gap.

7. The enterprise value assessment system of claim 1, wherein the computer processor executes said threshold engine to compare the scores to predetermined thresholds identify flags impeding ability to transfer the enterprise, and executes said output engine to generate a flags report containing the flags.

8. The enterprise value assessment system of claim 1, wherein the market drivers and the operational drivers include the following:
- growth;
- recurring revenue;
- brand;
- business overview;
- operations;
- human resources;
- large potential market;
- barriers to entry;
- margin advantage;
- financial;
- customer satisfaction;
- legal;
- dominant market share;
- production differentiation;
- customer diversification;
- sales and marketing;
- senior management; and
- innovation.

9. The enterprise value assessment system of claim 1, wherein the computer processor:
- executes said output module to display the indication of workbook completion process by displaying a progress indicator to indicate percentage of workbook completion in the form of a bar graph.

10. The enterprise value assessment system of claim 1, wherein the computer processor executes said output engine to maintain a vault of printable inputs received from the user.

11. The enterprise value assessment system of claim 1, wherein the computer processor executes said feedback engine to obtain user input including an industry selection, financial performance information, and selections that produce the asset rating, and the computer processor executes said threshold engine to implement a performance information selector that receives the industry selection and the financial performance information, and accesses a datastore of information specifying industry specific financial performance relevance to determine which portion of the financial performance information is relevant based on the industry selection, and selects the relevant financial performance.

12. The enterprise value assessment system of claim 11, wherein the computer processor executes said threshold engine to implement a trading range selector that receives the relevant financial performance and the industry selection, accesses a datastore of industry specific normalized trading ranges, and selects a normalized trading range corresponding to an enterprise in an industry according to the industry selection that exhibits the relevant financial performance.

13. The enterprise value assessment system of claim 12, wherein the computer processor executes said threshold engine to implement an enterprise value selector that receives the normalized trading range and the asset rating, and that uses the asset rating to the determine the enterprise value with respect to the normalized trading range.

14. An enterprise value assessment method for determining a forward-looking value of an enterprise, the method comprising:
displaying, by a computer processor, contents of a workbook according to user selections, wherein the workbook has a tree structure of weighted nodes configured to generate scores according to user inputs regarding an enterprise respective of market drivers and operational drivers;
populating the workbook, by the computer processor, with collected user data, thereby generating a partially completed workbook;
using, by the computer processor, the partially completed workbook to generate the scores; and
providing, by the computer processor, feedback to the user, including displaying the scores, displaying an indication of workbook completion progress, displaying information regarding how at least one score for a section of the workbook was derived and one or more incomplete sub-sections of the workbook for the section, and displaying two or more options, including a first option selectable by the user to go back and refine the scores by completing at least one unfinished section of the partially completed workbook, and a second option selectable by the user to continue to a next section of the partially completed workbook without first completing the at least one unfinished section of the partially completed workbook;
using the scores to calculate, by the computer processor, an asset rating and the value of the enterprise;
generating, by the computer processor, one or more reports, including an enterprise value report containing the asset rating and the value of the enterprise;
calculating, by the computer processor, a confidence estimate regarding the value of the enterprise, where the confidence estimate is calculated based on:
financial performance versus industry norm;
the asset rating;
presence of flags that affect the ease with which the enterprise may be sold; and
amount of completion of the workbook;
wherein generating the one or more reports includes generating the enterprise value report to further contain the confidence estimate; and
presenting data representative of the value of the enterprise and an interactive prioritized task list to the user via a user interface, where the interactive prioritized task list is configured to allow the user to take steps to improve the value of the enterprise.

15. The method of claim 14, further comprising:
calculating, by the computer processor, a value gap,
wherein generating the one or more reports includes generating the enterprise value report to further contain the value gap.

16. The method of claim 15, wherein generating the one or more reports includes comparing the scores to predetermined thresholds to generate a prioritized task list containing next steps to improve at least one of the confidence estimate or the value of the enterprise, wherein the computer processor displays the prioritized task list having at least one task that includes the first option selectable by the user to go back and refine the scores by completing the at least one unfinished section of the partially completed workbook.

17. The method of claim 15, wherein the prioritized task list is sortable by the following:
driver;
score;
value gap; and
bang for the buck.

18. The method of claim 15, wherein generating the one or more reports includes generating an overview report containing the asset rating, the enterprise value, the value gap, progress regarding improvement of the enterprise value, flags, critical drivers responsible for the value gap, and graphical assessments of the enterprise value and asset rating.

19. The method of claim 15, wherein generating the one or more reports includes generating a value gap analysis providing a graphical assessment of critical drivers responsible for the value gap.

20. The method of claim 14, wherein generating the one or more reports includes comparing the scores to predetermined thresholds to generate a flags report indicating important issues impeding ability to transfer the enterprise.

21. The method of claim 14, wherein the market drivers and the operational drivers include of the following:
growth;
recurring revenue;
brand;
business overview;
operations;
human resources;
large potential market;
barriers to entry;
margin advantage;
financial;
customer satisfaction;
legal;
dominant market share;
production differentiation;
customer diversification;
sales and marketing;
senior management; and
innovation.

22. The method of claim 14, wherein displaying the indication of workbook completion progress includes displaying a progress indicator to indicate percentage of workbook completion in the form of a bar graph.

23. The method of claim 14, further comprising:
maintaining a vault of printable inputs received from the user.

24. The method of claim 14, further comprising:
obtaining user input including an industry selection, financial performance information, and selections that produce the asset rating;
accessing a datastore of information specifying industry specific financial performance relevance to determine which portion of the financial performance information is relevant based on the industry selection; and
selecting the relevant financial performance.

25. The method of claim 24, further comprising:
employing the relevant financial performance and the industry selection to access a datastore of industry specific normalized trading ranges; and
selecting a normalized trading range corresponding to an enterprise in an industry according to the industry selection that exhibits the relevant financial performance.

26. The method of claim 25, further comprising:
employing the asset rating to determine the enterprise value with respect to the normalized trading range.

27. A system for generating a forward-looking enterprise value assessment, said system comprising:
   a graphical user interface for receiving user interaction, said user interaction specifying user input including an industry selection, financial performance information, and selections respective of market drivers and operational drivers in a user navigable workbook application, wherein said graphical user interface provides feedback to a user by:
      displaying scores generated by partial completion of a workbook of said user navigable workbook application;
      displaying an indication of workbook completion progress;
      displaying information regarding how at least one score for a section of the workbook was derived and one or more incomplete sub-sections of the workbook for the section; and
      displaying two or more options, including a first option selectable by the user to go back and refine the scores by completing at least one unfinished section of the partially completed workbook, and a second option selectable by the user to continue to a next section of the partially completed workbook without first completing the at least one unfinished section of the partially completed workbook; and
   a central processing unit having a first data unit for producing an asset rating regarding a relative value of the enterprise based on the selections and a second data unit for generating the value of the enterprise based on the industry selection, the financial performance information, and the asset rating;
   wherein said central processing unit further comprises a third data unit calculating a confidence estimate regarding the enterprise value, and said graphical user interface receives the confidence estimate and generates the display of the enterprise value report to contain the confidence estimate;
   wherein said third data unit calculates the confidence estimate based on:
      financial performance versus industry norm;
      the asset rating;
      presence of flags that affect the ease with which the enterprise may be sold, and amount of completion of the workbook application;
   wherein said graphical user interface receives the asset rating and the value of the enterprise and generates a display of an enterprise value report containing the asset rating and the enterprise value; and
   wherein said graphical user interface presents data representative of the value of the enterprise and an interactive prioritized task list to the user via a user interface, where the interactive prioritized task list is configured to allow the user to take steps to improve the value of the enterprise.

28. The system of claim 27, wherein said central processing unit further comprises a fourth data unit calculating a value gap and said graphical user interface receives the value gap and generates the display of the enterprise value report to contain the value gap.

29. The system of claim 27, wherein said graphical user interface solicits upload of printable inputs from the user, said central processing unit having a datastore for maintaining a vault of the printable inputs received from the user.

* * * * *